Figure 1:
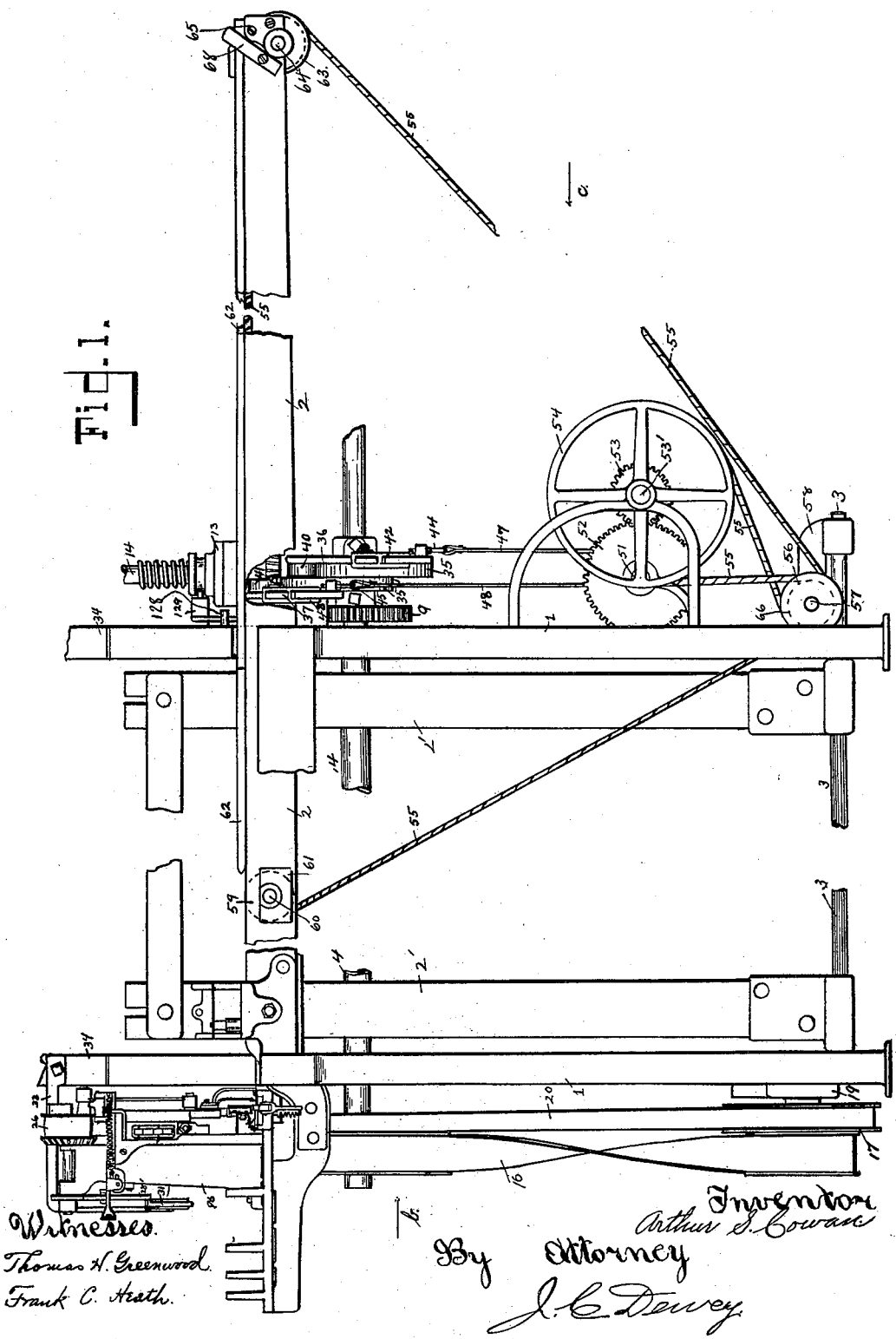

No. 665,312. Patented Jan. 1, 1901.
A. S. COWAN.
LOOM FOR WEAVING HAIRCLOTH.
(Application filed Feb. 12, 1898.)

(No Model.) 9 Sheets—Sheet 1.

Witnesses.
Thomas H. Greenwood.
Frank C. Heath.

Inventor
Arthur S. Cowan
By Attorney
J. C. Dewey.

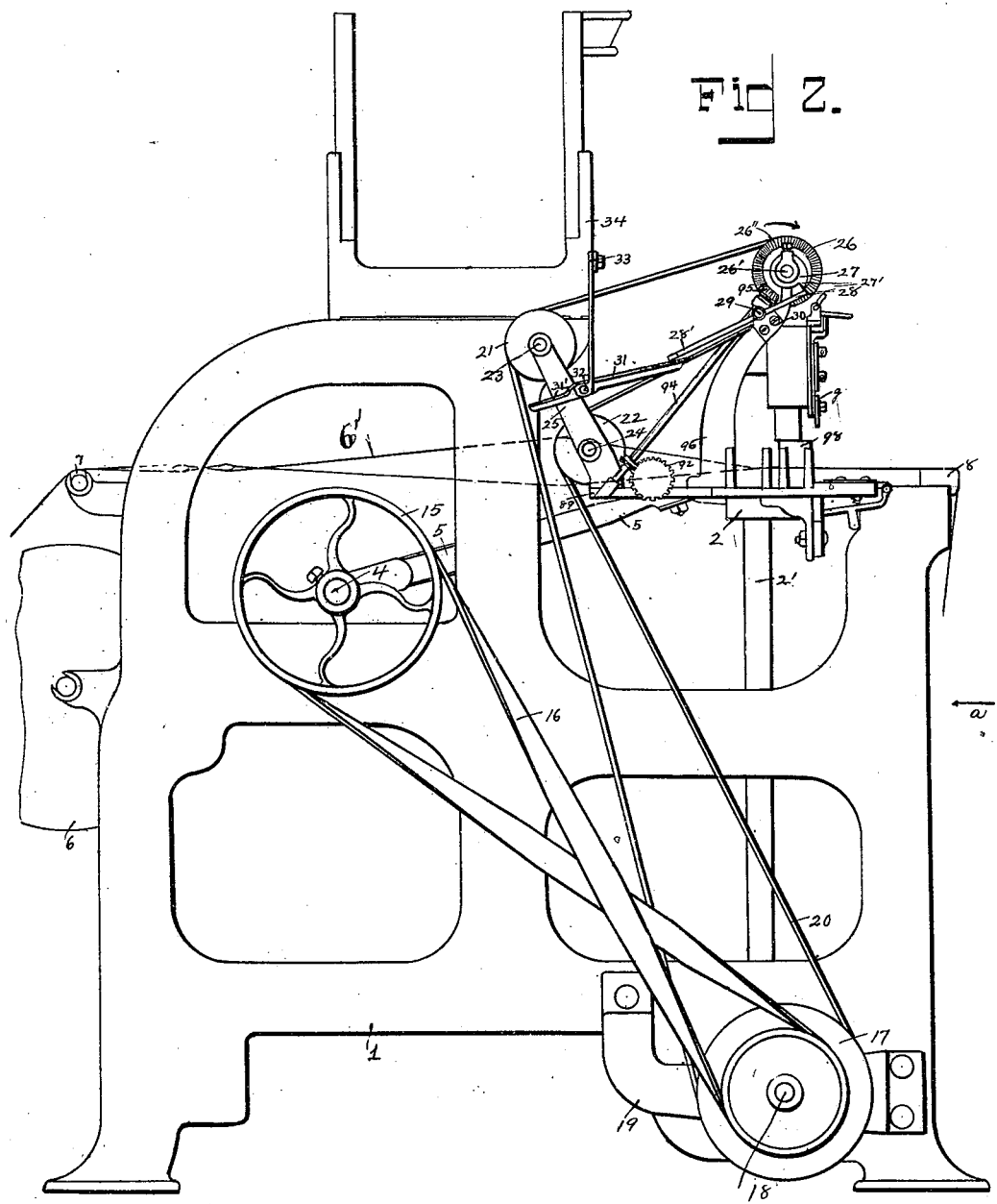

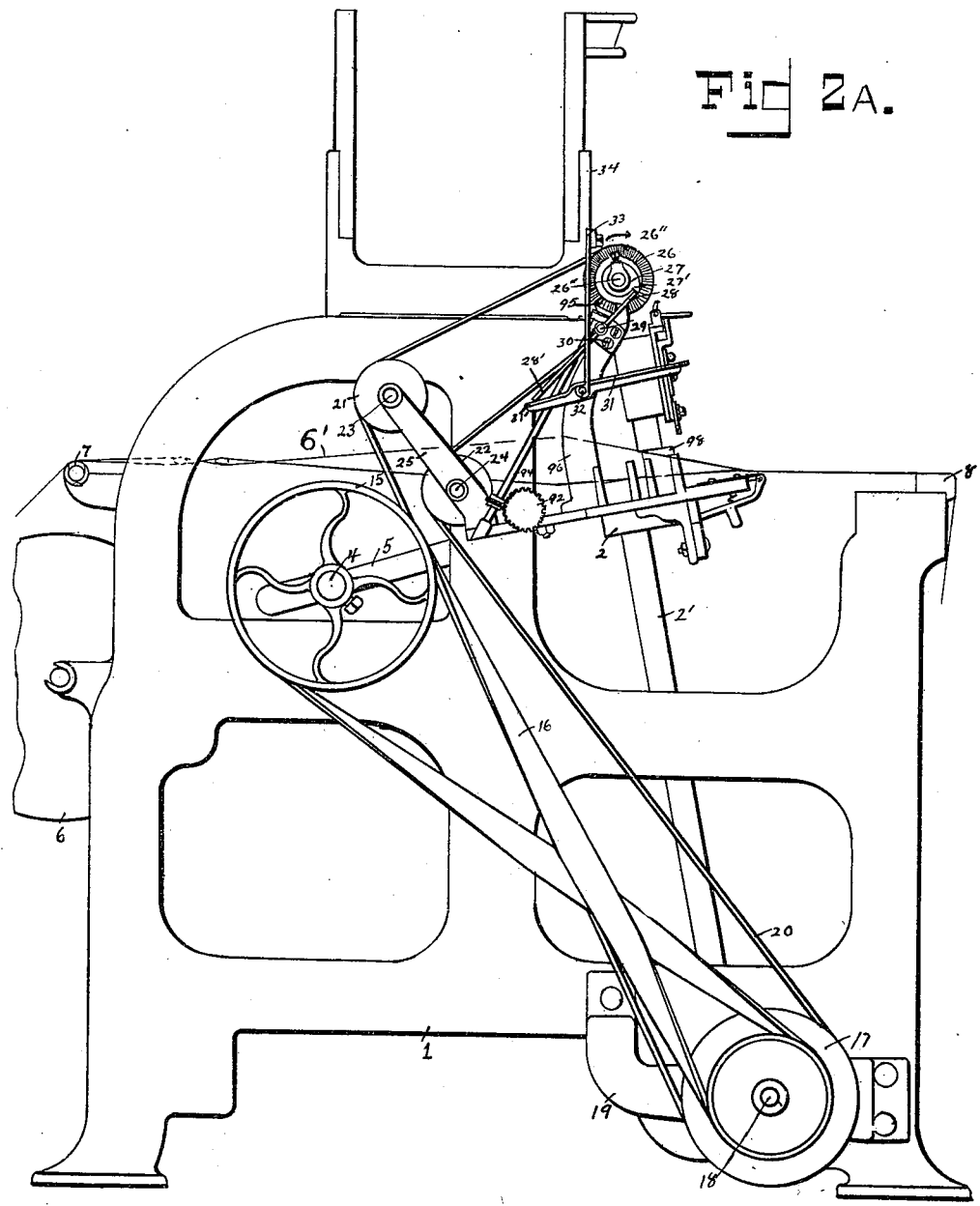

No. 665,312. Patented Jan. 1, 1901.
A. S. COWAN.
LOOM FOR WEAVING HAIRCLOTH.
(Application filed Feb. 12, 1898.)
(No Model.) 9 Sheets—Sheet 4.
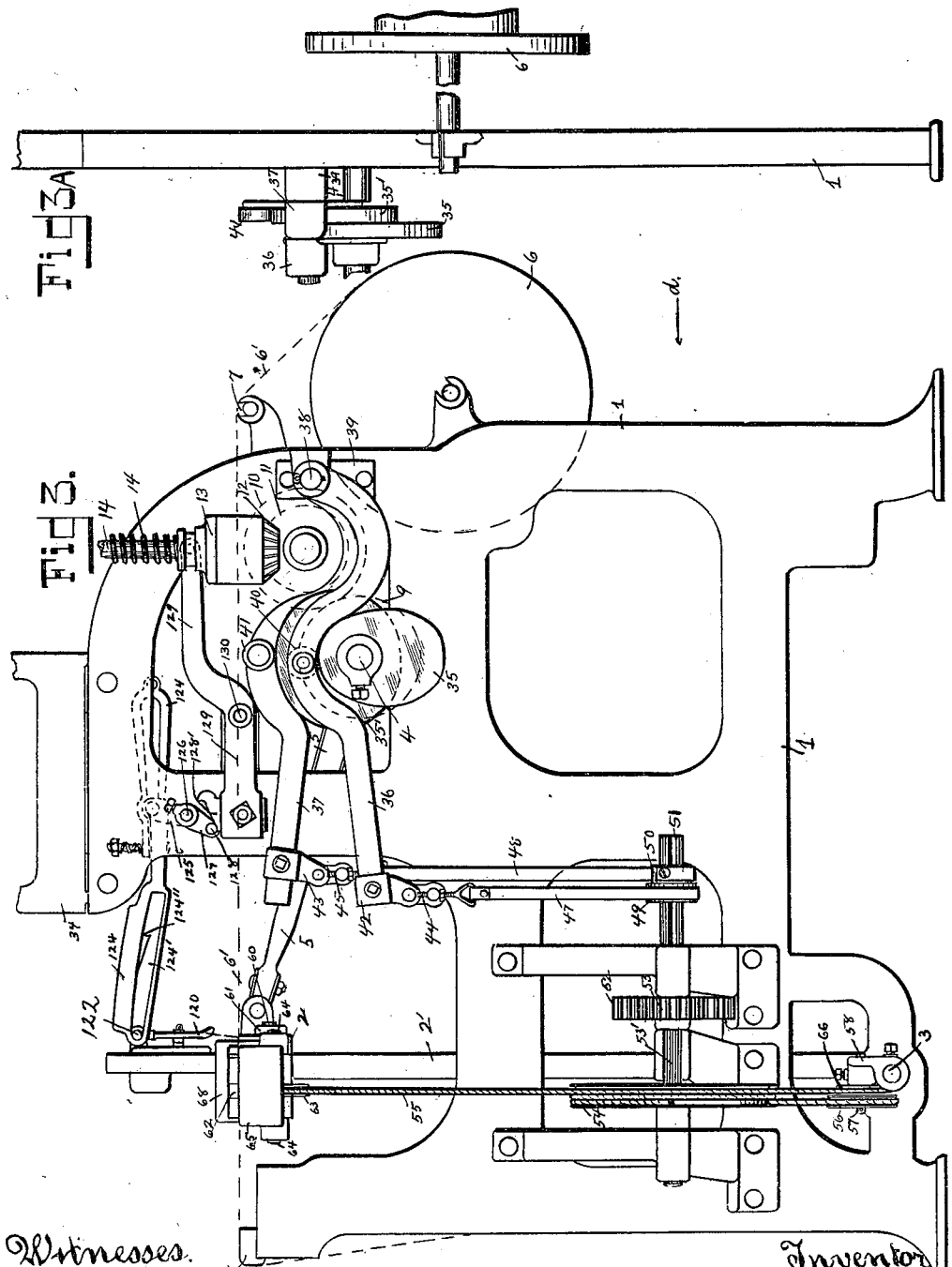

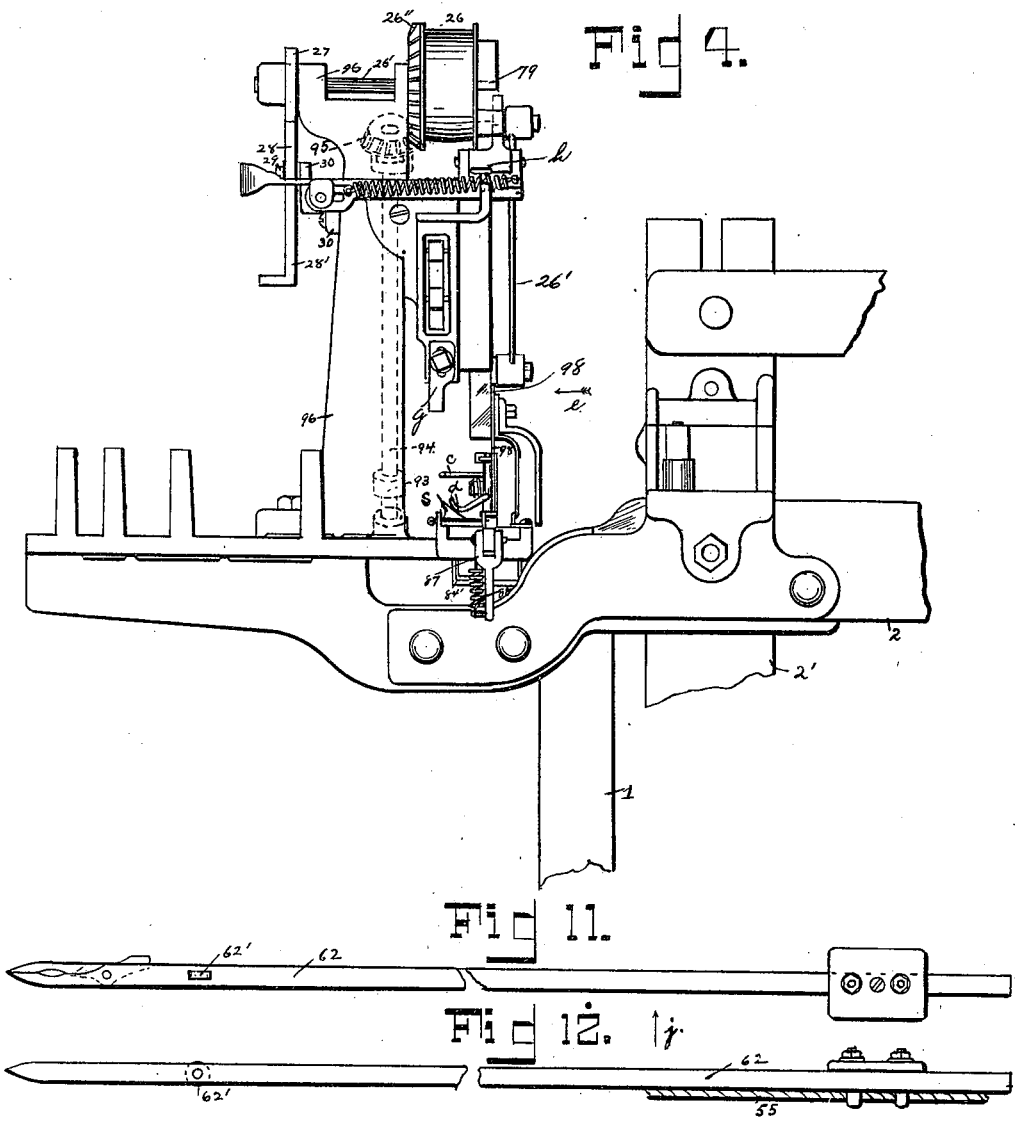

No. 665,312. Patented Jan. 1, 1901.
A. S. COWAN.
LOOM FOR WEAVING HAIRCLOTH.
(Application filed Feb. 12, 1898.)
(No Model.) 9 Sheets—Sheet 6.
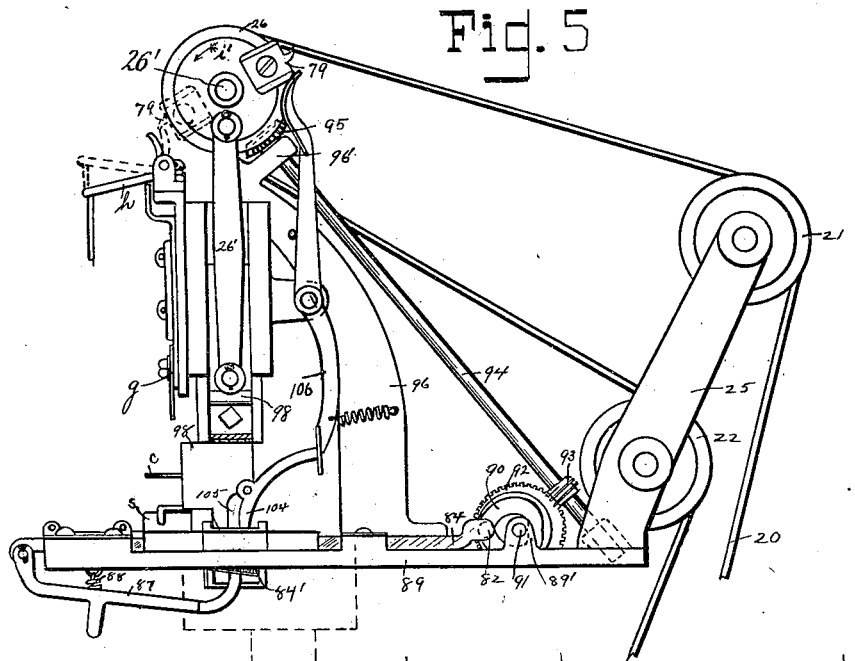
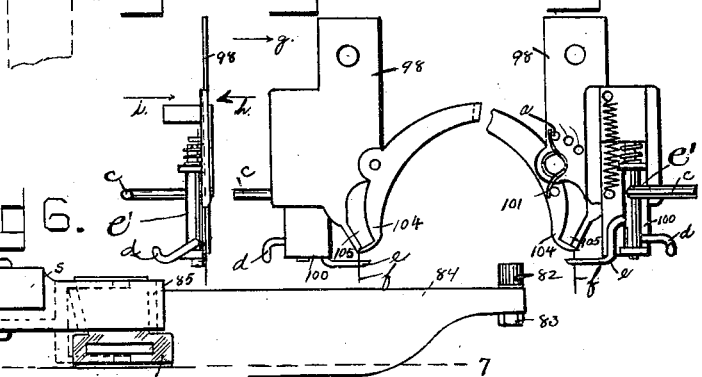
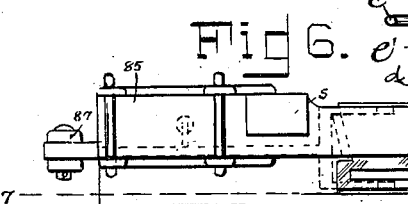
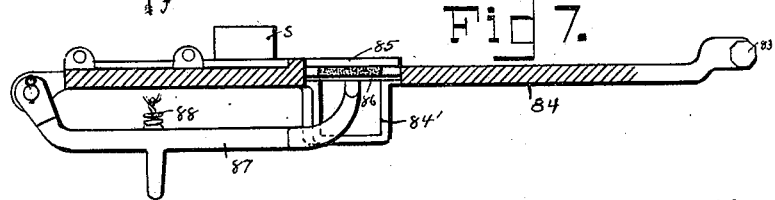
Witnesses
Thomas H. Greenwood
Frank C. Heath
Inventor
Arthur S. Cowan
By Attorney
J. C. Dewey

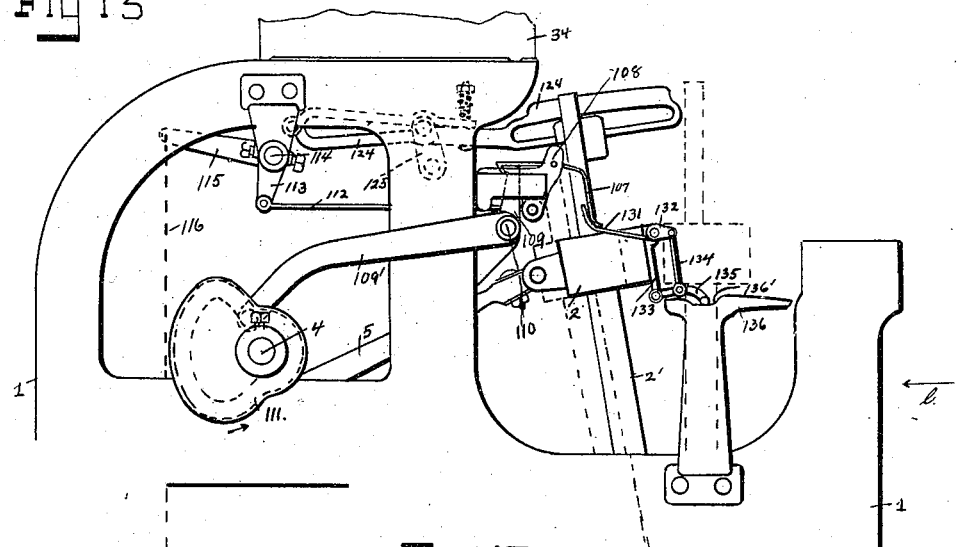
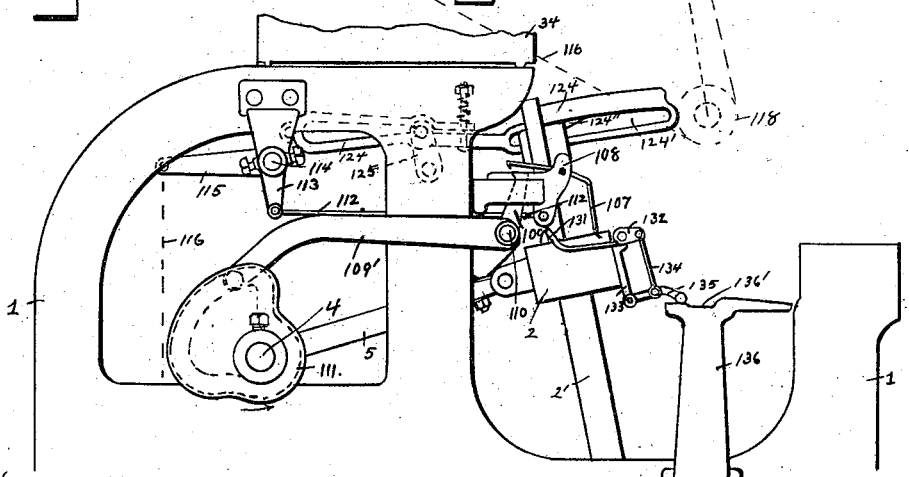

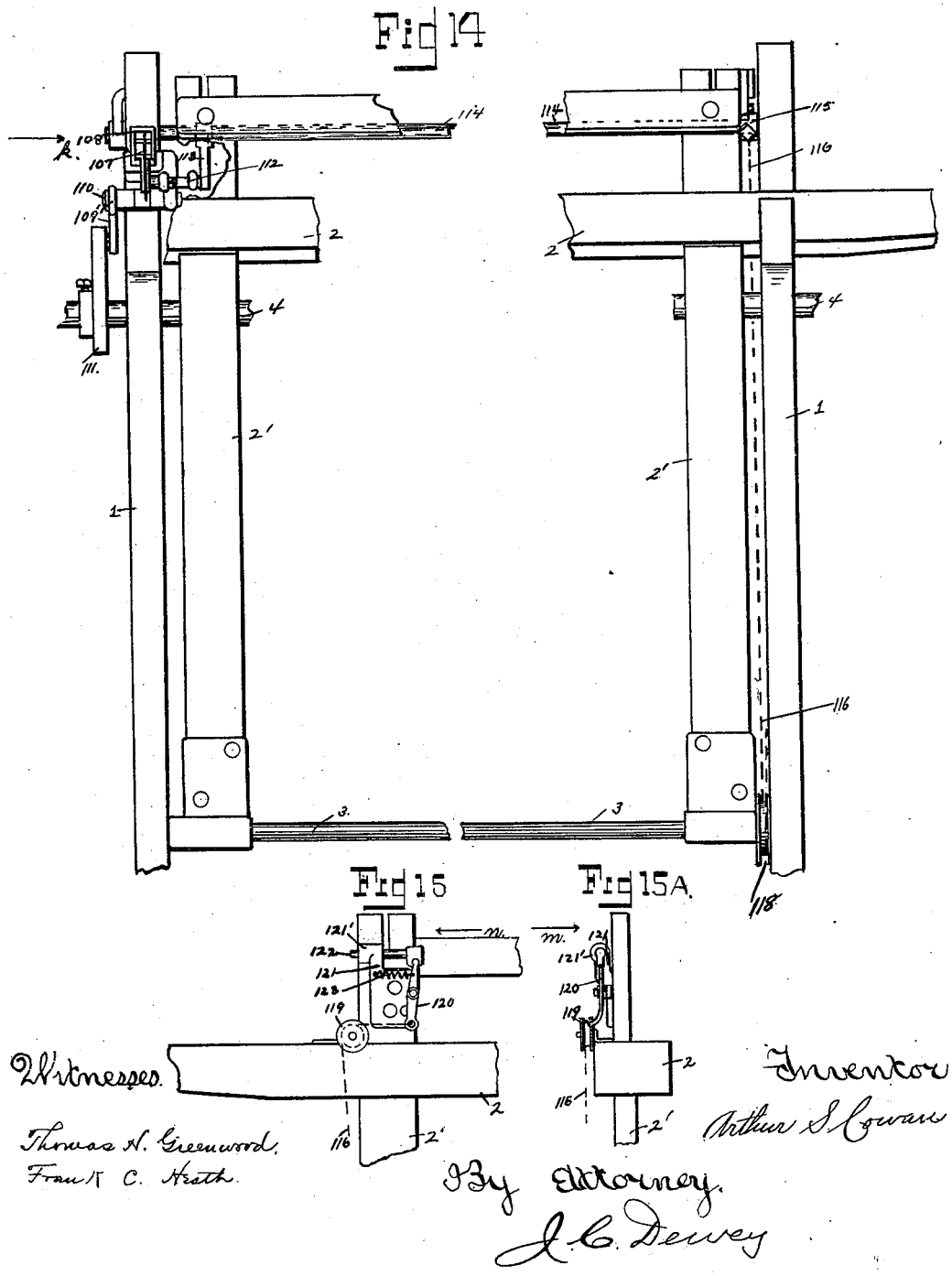

No. 665,312. Patented Jan. 1, 1901.
A. S. COWAN.
LOOM FOR WEAVING HAIRCLOTH.
(Application filed Feb. 12, 1898.)
(No Model.) 9 Sheets—Sheet 9.
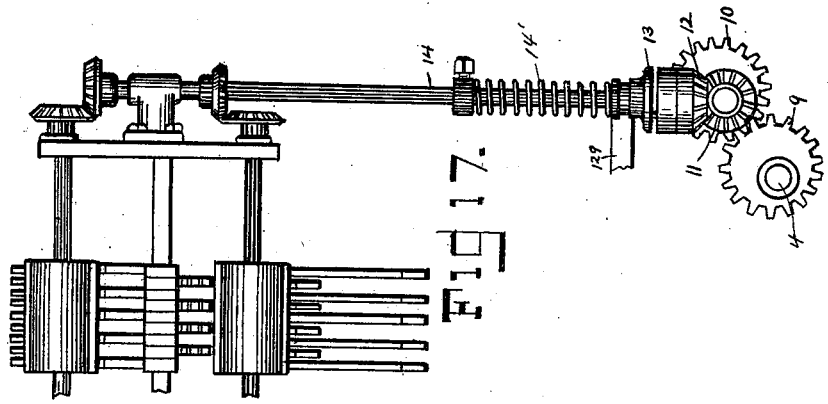
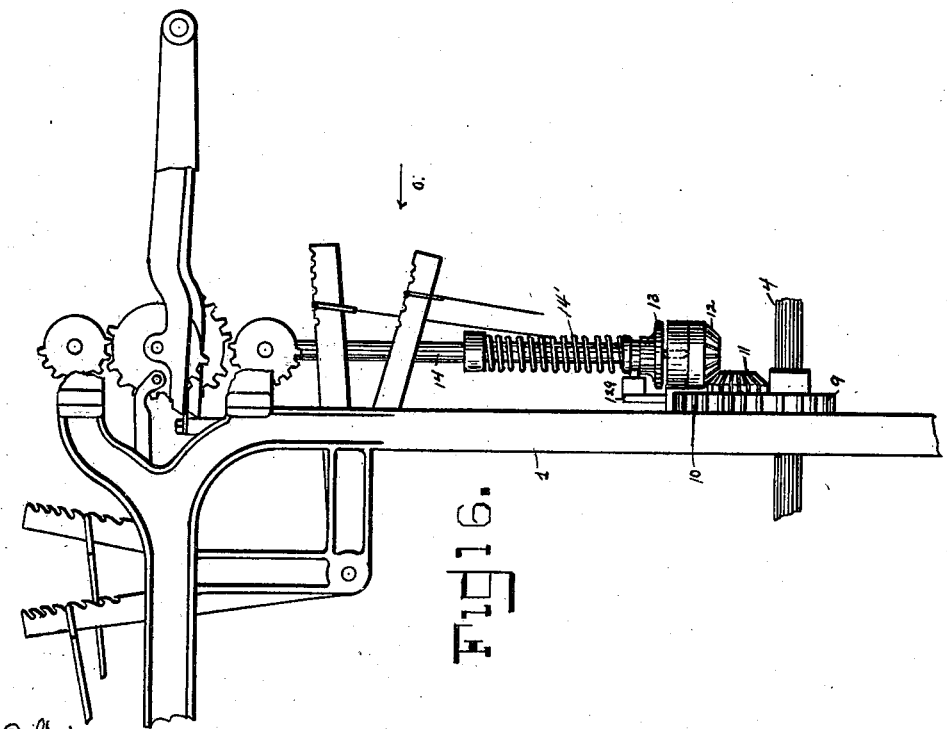
Witnesses.
Thomas N. Greenwood.
Frank C. Heath.
Inventor.
Arthur S. Cowan.
By Attorney.
J. C. Dewey

UNITED STATES PATENT OFFICE.

ARTHUR S. COWAN, OF WORCESTER, MASSACHUSETTS, ASSIGNOR TO THE AMERICAN HAIR CLOTH COMPANY, OF PAWTUCKET, RHODE ISLAND.

LOOM FOR WEAVING HAIRCLOTH.

SPECIFICATION forming part of Letters Patent No. 665,312, dated January 1, 1901.

Application filed February 12, 1898. Serial No. 670,073. (No model.)

*To all whom it may concern:*

Be it known that I, ARTHUR S. COWAN, a citizen of the United States, residing at Worcester, in the county of Worcester and State of Massachusetts, have invented certain new and useful Improvements in Looms for Weaving Haircloth, of which the following is a specification.

My invention relates to looms for weaving haircloth and similar fabrics; and the object of my invention is to improve upon the construction of this class of looms as now ordinarily made and to make a loom for weaving haircloth which may be operated at greater speed than heretofore and may weave figured haircloth goods, if desired.

My improvements are designed particularly to be applied to modern fast-running looms of the well-known Knowles type, shown and described in Reissue Patent No. 7,784, of July 3, 1877, and to be combined with some of the well-known mechanisms employed in haircloth-looms and which are fully shown and described in United States Letters Patent heretofore granted, and particularly in Patents Nos. 32,634, 44,808, 45,107, and 119,278, granted to I. Lindsley, to which reference is hereby made for detail drawings and descriptions of several of the mechanisms which are combined with my improvements in this application.

My invention consists in certain novel features of construction and combination of parts of my improvements in looms for weaving haircloth, as will be hereinafter fully described.

Referring to the drawings, Figure 1 is a front elevation of portions of a loom embodying my improvements looking in the direction of arrow $a$, Fig. 2. Fig. 2 is a side view of the loom looking in the direction of arrow $b$, Fig. 1. Fig. 2$^a$ corresponds to Fig. 2, but shows the lay in its opposite or rear position. Fig. 3 is a side view of the opposite end of the loom looking in the direction of arrow $c$, Fig. 1. Fig. 3$^a$ is a partial rear view of some of the parts shown in Fig. 3 looking in the direction of arrow $d$, same figure. Fig. 4 is, on an enlarged scale, a front view of the serving mechanism. Fig. 5 is a side view of the serving mechanism shown in Fig. 4 looking in the direction of arrow $e$. Fig. 6 is a plan view of the hair-box on an enlarged scale. Fig. 7 is a vertical section on line 7 7, Fig. 6, looking in the direction of arrow $f$, same figure. Fig. 8 is a front view of the selecting instrument looking in the direction of arrow $g$, Fig. 9. Fig. 9 is a side view of the same looking in the direction of arrow $h$, Fig. 8. Fig. 10 is the opposite side view looking in the direction of arrow $i$, Fig. 8. Fig. 11 is a plan view of the nipper. Fig. 12 is an edge view looking in the direction of arrow $j$, Fig. 11. Fig. 13 is an end view looking in the direction of arrow $k$, Fig. 14, showing parts of the automatic stopping mechanism. Fig. 13$^a$ corresponds with Fig. 13, but shows the several parts of the mechanism in a different position. Fig. 13$^b$ is a front detail view of the detector-finger and supplemental device used therewith. Fig. 14 is a front view of portions of the loom and of the mechanism shown in Fig. 13 looking in the direction of arrow $l$, same figure. Fig. 15 is a side detail view of the stop-pin device looking in the direction of arrow $m$, Fig. 15$^a$. Fig. 15$^a$ is an edge view of the stop-pin device looking in the direction of arrow $n$, Fig. 15. Fig. 16 shows a front view of what is termed a "harness-motion" and its driving mechanism, which are located on the loom above the parts shown at the right in Fig. 3; and Fig. 17 is a side view of the same looking in the direction of arrow $o$, Fig. 16.

In the accompanying drawings, 1 represents the loom sides or frames of the loom.

2 is the lay, and 2' the lay-swords, supported at their lower ends on the lay-shaft 3.

4 is the crank-shaft, and 5 the crank-connectors to the lay. (See Figs. 2 and 3.)

The warp-beam 6 is mounted at the rear of the loom and carries the warp-threads 6', which pass over the back roll 7 to the breast-beam 8 and over the harnesses (not shown) and after the cloth is woven over the breast-beam to the take-up roll. (Not shown.)

All of the above parts may be of the ordinary construction and operation in this class of looms.

Power is communicated to the harness-motion, (see Figs. 16 and 17,) which is in this instance of the well-known Knowles type shown and described in patent above referred to and need not be described herein, through gears 9 and 10, beveled gears 11 and 12, clutch 13, and upright shaft 14 in the usual and well-known way and as shown and described in United States Patent No. 392,383, except that in my construction the gears 9 and 10 are in this instance eccentric gears, which cause the harness-motion to be operated quicker at a certain time to close the shed and bring the warp-threads 6' to a straight line, as shown in Fig. 3, before the nipper-stick, to be hereinafter described, has fully left the warp-threads and about the time the other end of the hair which is drawn in between the warp-threads leaves the bunch of hair. This keeps the hair straight in the shed until it is beaten in place by the reed.

By employing the eccentric gears 9 and 10 or their equivalents to close the shed quickly at a certain time, as above stated, I am enabled to bind or hold the hair in the shed and do away with the binder ordinarily used.

On the crank-shaft 4 (see Fig. 2) is a pulley 15, belted by belt 16 to a double pulley 17, loose on a stud 18, fast on a stand 19, secured to the loom side. A second belt 20 extends from the double pulley 17 and passes over pulleys 21 and 22, mounted on pins 23 and 24, fast in the stand 25, which moves with the lay, and around a pulley 26 to drive the selecting mechanism to be hereinafter described. The stud 18, on which the double pulley 17 runs, is located near the pivot-point of the lay, so that the lay swings at or near the axis of the double pulley 17, and therefore the belt 20 will be at the proper tension at all intermediate positions of the lay and in its extreme forward and backward positions. (Shown in Figs. 2 and 2ᵃ.)

I will now refer to the nipper mechanism and its operating mechanism, which are substantially of the ordinary construction and operation in this class of looms, with some modifications forming my improvements, which I will now describe.

On the crank-shaft 4 (see Fig. 3) are fast two cams or a double cam 35 35', which works the two levers 36 and 37, pivoted on a stud 38, fast in a stand 39 on the loom-frame. Rolls 40 and 41 are mounted on the levers 36 and 37 and travel on the peripheries of the double cam 35 35'. To the free front ends of the levers 36 and 37 are adjustably secured swivel-blocks 42 and 43, to which are attached adjustable links 44 and 45, and to said links are secured the ends of straps 47 and 48. The other ends of said straps are secured upon opposite sides of rolls 49 and 50, which are keyed to a shaft 51 to turn said shaft, which is journaled in bearings secured to the loom side and has a gear 52 fast thereon and drives a gear 53, fast on shaft 53', carrying the wheel 54, also fast on said shaft 53'. (See Figs. 1 and 3.) A cord 55 passes around the grooved periphery of the wheel 54 a number of times and is secured at each end to said wheel 54. Said cord 55 passes from said wheel 54 around a pulley 56, loosely mounted on a stud 57, fast in the stand 58 on the shaft 3, (see Fig. 1,) to the grooved pulley 59, loosely mounted on a pin 60, fast in the stand 61, secured to the lay 2 and through a groove in the top of the lay and is secured to the under side of the nipper-stick 62 (see Fig. 12) and passes over a pulley 63, loosely mounted on a pin 64, fast in the stand 65, secured on the lay, (see Fig. 1,) to the roll 66, loosely mounted on the pin 57, and back to the wheel 54 and is wound around said wheel, as shown in Fig. 3. A strap 68 on the end of the lay (see Fig. 1) is used as a bunter or stop for the nipper-stick 62. It will thus be seen that as the crank-shaft 4 revolves, carrying the double cam 35 35', the nipper-stick 62, through the intervening mechanism, is moved forward to seize the end of a hair and is then drawn back to draw the hair into the shed.

I preferably provide the nipper-stick 62 with a roll 62', as shown in Figs. 11 and 12, at its forward end, which tends to keep the nipper from breaking the warp-threads on entering the shed, and also causes it to run easier.

I will now briefly describe the operating mechanism of the selecting mechanism shown in the drawings and which is of the well-known construction and operation heretofore used in this class of looms and fully shown and described in the patents hereinbefore referred to, and particularly in United States Patent No. 119,278 to I. Lindsley.

The revolution of the pulley 26 by the belt 20 through a connector 26' communicates a reciprocating up-and-down motion to the plate 98, carrying the selecting instrument, comprising two parts 104 and 105 of the ordinary construction and operation. The movable part 104 is positively operated to open and release the hair by a lever 106 (see Fig. 5) in the ordinary way and is actuated by a spring 101, (see Fig. 10,) the tension of which may be adjusted by means of the pins $a$ to close the part 104 and grip the hair. In this instance there are three revolutions of the pulley 26 during the forward stroke of the lay, so that the selecting instrument may be moved down three times to grasp and raise a hair from the box or reservoir in which they are contained. When the selecting instrument fails to seize a hair, the movement of the same is stopped on the backward motion of the lay, as follows: The detent or cam 27 (see Fig. 2) is fast to the shaft 26' of the pulley 26 and revolves with said shaft and pulley. When the selecting mechanism has tried two or three times to seize a hair and fails, the lever 28, pivoted on a stud 29 on a stand 30, is held out of engagement of cam 27 by the end 28' of said lever resting on a stationary arm 31, secured at 32 on a stand 33, secured to the arch-stand 34, until the end 28' passes onto the depressed or inclined portion 31' of the arm 31 (see Fig. 2ᵃ) and raises the opposite end of the lever 28 to cause it to engage the projection 27' on the cam 27 and prevent the continued revolution of said cam and the pulley 26 and the movement of the selecting mechanism until the forward movement of the lay carries the end 28' of the lever 28 onto the higher portion of the arm 31 and disengages the opposite end of said lever 28 from the cam 27 and allows said cam to revolve in the usual way, the driving-belt 20 slipping on the pulley 26 when it is stopped.

It will be understood that in haircloth-looms the selecting instrument has a detector $d$, worked by an incline S, Fig. 4, to oscillate the arm $c$, Figs. 8 and 9.

The arm $e$, fast on the rotary spindle $e'$, coöperates with the arms $c$ and $d$, also fast on said spindle, and swings across the space below the selecting instrument (see Figs. 9 and 10) and between the lower ends of the selecting instrument and the strands of hair held in the hair box or reservoir after each downward movement of the selecting instrument in case it fails to grasp and raise a hair; but when a hair is raised the swinging movement of the arm $e$ is arrested by the hair and the arm $c$ as the selecting instrument is raised is in position to and engages with the sliding mechanism $g$ to raise the bell-crank lever $h$, as shown by dotted lines, Fig. 5, and causes it to engage the catch 79 on the pulley 26, which is revolved in the direction of arrow $i'$, (see Fig. 5,) and stop the revolution of said pulley, the operating-belt 20 slipping on said pulley without turning it, and also stop the selecting instrument driven from said pulley. At the proper time the bell-crank lever $h$ is disengaged from the catch 79 in the ordinary way and the pulley 26 is free to turn and operate the selecting instrument.

I will now describe the hair box or magazine and its operating mechanism. (See Figs. 5, 6, and 7.)

The roll 82 is mounted on a stud 83, fast in the slide 84, which has a reciprocating motion on the stand 89. 84' is a box or recess, which I prefer to be square in cross-section, to receive the bunch of hair. The plate 85 holds the hairs on the top side, and the plate 86 presses the hairs up to said plate 85 by means of an arm 87, pivoted at its outer end to the slide 84, operated by a spring 88 in the usual way. The roll 82 extends into a groove in the cam 90, fast on a shaft 91, mounted to turn in bearings 89' on a stand 89. On the shaft 91 is a worm-gear 92, which meshes with the worm 93, fast on the inclined shaft 94. The shaft 94 has bearings in the stand 89 at its lower end and at its other end has bearings 96' on the stand 96. The pulley 26 has a beveled gear 26'' (see Fig. 4) on one side, which meshes with a beveled gear 95 on the upper end of the shaft 94. The revolution of the pulley 26 through beveled gears 26'' and 95, shaft 94, worm 93, and worm-gear 92 drives the shaft 91 and cam 90, fast thereon, and causes the slide 84 to move in one direction and then in the other as the selecting instrument is operated to make a positive feed.

I will now describe my mechanism forming a part of my improvements which I employ to automatically stop the harness-motion when the selecting instrument fails to seize a hair, as above referred to.

Referring to Figs. 13 and 13$^a$, it will be seen that a detector wire or finger 107 is pivoted in a slide 108, which has a reciprocating motion in a stand secured to the loom side or frame, and the downwardly-extending end of said detector-wire extends in such a position that it will be in front of the hair which is drawn into the shed (see Fig. 13$^b$) when the lay is in its rear position, and as the lay beats up the finger 107 will be engaged by said hair. The opposite end of the detector-wire 107 is made hooked and adapted to extend over and engage the upper end of an arm 109, fast on a shaft 110, mounted in bearings fast to the loom side. Upon said shaft 110 is also fast an arm 109', which has a roll thereon at its inner end which travels in a groove in the face of a cam 111, fast on the crank-shaft 4. To the lower part of the slide 108 is attached one end of a link or connector 112. The opposite end of said connector 112 is attached to an arm 113, fast on a rock-shaft 114, which extends across the loom, at the rear part thereof, and has bearings in stands secured to the loom sides. To the opposite end of the shaft 114 is secured an arm 115, to the outer end of which is attached a cord 116, leading over a pulley 117 to a pulley 118 on the rock-shaft 3 (see dotted lines, Figs. 13 and 14) and over a pulley 119 on the lay-sword (see Figs. 15 and 15$^a$) to a lever 120, centrally pivoted on a stand 121, bolted to the lay-sword. The lever 120 has a pin 122 secured in its upper end and adapted at its outer end to move in and out through a hub or sleeve 121' on the stand 121. A spring 123 tends to keep the pin 122 in its inward position. On the opposite end of the loom from the detector-wire 107 is an arm 124. (See Figs. 3, 13, and 13$^a$.) The front end of the arm 124 has an elongated slot 124' therein and a projection forming a notch 124'' on one side thereof. (See Figs. 3 and 13$^a$.) The inner end of the pin 122 extends into and travels in the slot 124' as the lay moves back and forth when the loom is running in its normal condition; but when in the absence of filling the detector wire or finger 107 fails to be tilted and the slide 108, carrying said detector-wire, has a rearward motion the pin 122, connected with said slide 108 through intermediate connections, is actuated by the spring 123 (see Fig. 15) and moves inwardly through the slot 124' (see Fig. 3) to engage the notch 124'' on the farther side of the slotted portion 124' of the arm 124 to move said arm or slide 124. On said shaft is fast an arm 127, carrying a pin 128, adapted to ride on an incline 128', adjustable in the end of an arm 129, centrally pivoted at 130 and adapted to engage at its other end with a clutch 13 to release the upright driving-shaft 14 and disconnect the harness-motion from the lay, as is fully shown and described in Patent No. 392,383, above referred to.

It will be understood that in disconnecting the harness-motion from the lay the shed is not changed, and the nipper will enter the same shed as before and put the hair in its proper place and make the correct weave or figure.

The operation of my harness-motion stop mechanism above described will be readily understood by those skilled in the art and is briefly as follows: The lay being in its backward position, as shown in Fig. 13$^a$, preparatory to beating up and the nipper mechanism having grasped a hair to draw it across the lay through the shed, as the lay beats up the hair will come in contact with the detector-wire 107 and tilt it up to move down its rear hooked end to engage with the arm 109, as shown in Fig. 13, and the revolution of the cam 111 in the direction of the arrow from the position shown in Fig. 13$^a$ to the position shown in Fig. 13 will, through arm 109' and arm 109, move back the slide 108 from the position shown in Fig. 13$^a$ to the position shown in Fig. 13 and, through connector 112, arm 113, shaft 114, arm 115, and cord 116, move the arm 120 to withdraw the pin 122 (see Fig. 15) and prevent its engagement with the notch 124'' on the arm 124, thus leaving said arm 124 stationary. Now if the nipper mechanism has failed to draw a hair into the shed as the lay beats up the detector-wire 107 will not be moved, but will remain in the position shown in Fig. 13$^a$, and the arm 109 will not move the slide 108 or the intermediate connections to the pin 122, so that the spring 123 will move the pin 122 in a position as the lay beats up to cause it to engage with the notch 124'' on the arm 124 and draw said arm forward and, through arm 125, shaft 126, arm 127, pin 128 engaging with the incline 128', force down the front end of the lever 129 and unclutch the upright shaft 14 from its driving mechanism to stop the harness-motion. On the backward movement of the lay the pin 122 will engage the inner end of the slot 124' in the arm 124 and move said arm back to its first position to release the lever 129 and allow the spring 14' on the upright shaft 14 to act to clutch the shaft to its driving-gears in the usual way.

It will be seen that the operation of the clutch mechanism for stopping the harness-motion is automatic in its operation and depends upon the seizure of a hair and the insertion of the same in the shed.

In connection with the detector-wire 107 I preferably employ an auxiliary mechanism consisting of two wires 131, adapted at their inner ends to extend one upon each side of and back of the detector-wire 107 (see Figs. 13, 13$^a$, and 13$^b$) and secured at their front ends on a lever 132, pivoted on a stand 133, secured to the front of the lay. The front end of the arm 132 is connected by a link 134 with a curved arm 135, pivoted at its rear end in the lower end of the stand 133 and adapted at its front end to travel on a stand 136, secured to the loom-frame and provided at its upper end with a cam-surface 136'. The wires 131 are bent up at their rear ends and are adapted to extend back of the hair as it is drawn by the nipper mechanism into the shed, as shown in Fig. 13$^a$. As the lay beats up the bent ends of the wires 131 engage with the hair and the front end of the arm 135 drops into the depressed portion of the cam-surface 136', as shown in Fig. 13, and the hair is held and pressed against the detector-wire 107 to engage said detector-wire and tilt it down at its rear hooked end.

It will be understood that the details of construction of the several parts of my improvements may be varied somewhat if desired, and they may be applied to different makes or styles of looms.

Having thus described my invention, what I claim as new, and desire to secure by Letters Patent, is—

1. In a loom for weaving haircloth and similar fabrics, the combination with the lay, and the hair or filling selecting mechanism carried on the lay, of a series of pulleys supported on a stand moving with the lay, a double pulley located near the pivot-point of the lay, a belt from said double pulley to a pulley on the crank-shaft and said pulley and crank-shaft, and a second belt from said double pulley to the series of pulleys moving with the lay, and communicating motion to the selecting mechanism, and under proper tension at all positions of the lay, substantially as shown and described.

2. In the mechanism for feeding the hairs or other fillings, the combination with the slide which has a reciprocating motion, and is provided with a box or recess for the ends of the hairs or fillings, and a roll on said slide to extend into a groove in an operating-cam, of said cam fast on a shaft, and mechanism for communicating a positive motion to said shaft and cam, and to the slide carrying the ends of the hairs or fillings, to make a positive feed, substantially as shown and described.

3. In a loom for weaving haircloth, and other similar fabrics, the combination with a stationary stand, a slide having a reciprocating motion thereon, and means for giving a reciprocating motion to said slide, and a detector wire or finger pivoted on said slide, said detector wire or finger having one end extending in front of and adapted to be engaged, on the forward beat of the lay, by the hair or filling drawn into the shed, to tilt down the opposite end of said finger, of one or more supplemental wires carried on the lay, and adapted to engage the hair or filling on the forward beat of the lay, as it is drawn into the shed, and move it into engagement with the first-mentioned detector wire or finger, and means for tilting or moving the free ends of the supplemental wire or wires, substantially as shown and described.

4. In a loom for weaving haircloth, and other similar fabrics, the combination with a stationary stand, a slide having a reciprocating motion thereon, and means for giving a reciprocating motion to said slide, and a detector wire or finger pivoted on said slide, said detector wire or finger having one end extending in front of and adapted to be engaged, on the forward beat of the lay, by the hair or filling drawn into the shed, to tilt down the opposite end of said finger, of one or more supplemental wires carried on the lay, and adapted to engage the hair or filling on the forward beat of the lay, as it is drawn into the shed, and move it into engagement with the first-mentioned detector wire or finger, and means for tilting and moving the free ends of the supplemental wire or wires, consisting of a cam-surface engaged by an arm, and said arm and intermediate connections to said supplemental wire or wires, substantially as shown and described.

5. In a loom for weaving haircloth, &c., the combination with a detector wire or finger located at one end of the loom, to be engaged by the hair or filling as it is drawn into the shed on the forward beat of the lay, and a slide located at the other end of the loom, and connections from said slide to the upright shaft of the harness-motion to unclutch and stop said shaft and said upright shaft, of connections intermediate the detector wire or finger and said slide, said detector wire or finger being operated by the presence of a hair or filling to prevent the movement of the slide to automatically stop the harness-motion, and the absence of a hair allowing the intermediate mechanism to operate to move the slide, and automatically stop the harness-motion, substantially as shown and described.

6. In a loom for weaving haircloth, &c., the combination with a detector wire or finger located at one end of the loom, and an arm located at the other end of the loom, and connections from said arm to the upright shaft of the harness-motion and said upright shaft, of connections intermediate said detector wire or finger and said arm, said detector wire or finger being operated by the presence of a hair or filling, to prevent the movement of the arm to automatically stop the harness-motion, and the absence of a hair or filling allowing the intermediate mechanism to operate to move the arm, and automatically stop the harness-motion, substantially as shown and described.

ARTHUR S. COWAN.

Witnesses:
J. C. DEWEY,
M. J. GALVIN.